(12) United States Patent
Hirata (10) Patent No.: US 6,683,861 B1
(45) Date of Patent: Jan. 27, 2004

(54) CDMA MOBILE COMMUNICATION SYSTEM, SEARCHER CIRCUIT AND COMMUNICATION METHOD

(75) Inventor: Masaru Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 09/580,125

(22) Filed: May 30, 2000

(30) Foreign Application Priority Data

Jun. 2, 1999 (JP) ............................................. 11/154455

(51) Int. Cl.[7] ................................................ H04B 7/216
(52) U.S. Cl. ........................................ 370/335; 370/342
(58) Field of Search ................................ 370/328, 331, 370/332, 333, 334, 335, 342; 375/130, 140, 142, 144, 147, 148, 150

(56) References Cited

U.S. PATENT DOCUMENTS

| | | | |
|---|---|---|---|
| 6,075,811 A | * | 6/2000 | Naruse et al. .............. 375/147 |
| 6,215,814 B1 | * | 4/2001 | Ylitalo et al. ................ 375/148 |
| 6,330,271 B1 | * | 12/2001 | Klang et al. ................. 375/134 |
| 6,385,181 B1 | * | 5/2002 | Tsutsui et al. .............. 370/335 |
| 6,408,039 B1 | * | 6/2002 | Ito .............................. 375/347 |

* cited by examiner

Primary Examiner—Kwang Bin Yao
(74) Attorney, Agent, or Firm—Scully, Scott, Murphy & Presser (57) ABSTRACT

A CDMA mobile communication system is capable reduce power consumption. A CDMA mobile communication device realizes a CDMA communication by combining outputs of finger circuits performing despreading for reception signals. The CDMA mobile communication device includes subtracted performing subtraction between delay profile data respectively output from at least two correlators respectively corresponding to reception signals transmitted from mutually different antennas, and assigning unit assigning the finger circuits for despreading reception signals to result of subtraction having signal level higher than and lower than a reference level so that outputs of the assigned finger circuits are combined.

15 Claims, 10 Drawing Sheets

CDMA MOBILE COMMUNICATION SYSTEM, SEARCHER CIRCUIT AND COMMUNICATION METHOD

BACKGROUND OF THE INVENTION

1. Field of the Invention

The present invention relates generally to a CDMA mobile communication system, a searcher circuit and a communication method. More particularly, the invention relates to a CDMA mobile communication system, a searcher circuit and a communication method realizing a Code Division Multiple Access (CDMA) communication by combining outputs of a finger circuit performing dispreading for a reception signal.

2. Description of the Related Art

In CDMA mobile communication which has been expected as a mobile communication in the next generation, a radio wave reaching to a mobile station from a base station is distributed into several fractions due to influence of buildings and the like. Therefore, there are a plurality of radio waves reaching to the mobile station. Respective radio waves causes delay.

In order to realize the CDMA communication, a path search function for recognizing a plurality of radio waves distributed by correlators of respective base stations and a Rake function for combining data of a plurality of finger circuits, each of which performs dispreading for a plurality of distributed radio waves are necessary.

When the mobile station moves, a hand over may be performed. The hand over includes a diversity hand over, in which cells are switched, and a soft hand over, in which sectors are switched.

Figure 8:
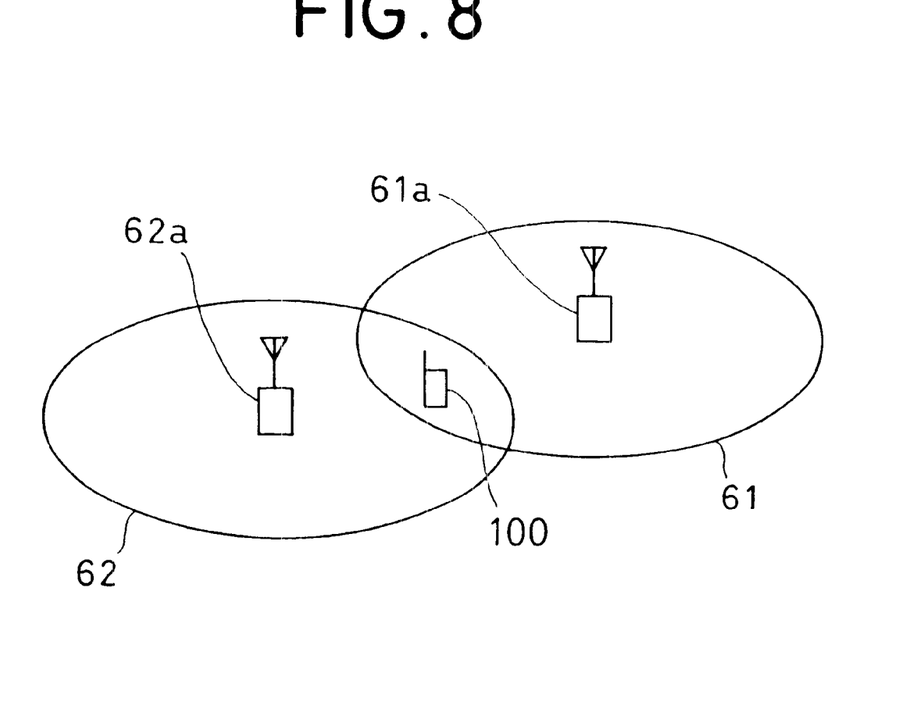
FIG. 8 is an illustration showing a relationship of positions of a mobile station and base stations in the case where a diversity hand over is to be performed.

As shown in FIG. 8, the diversity hand over, in which the cells are switched, is a switching operation to be caused when a device 100 as the mobile station is positioned at a position where a cell 61 and a cell 62 overlap, for switching from a condition receiving a transmission signal of the base station of lower reception power to a condition receiving a transmission signal of the base station of higher reception power. For example, an operation, in which the device 100 as the mobile station switches receiving condition from a condition receiving a transmission signal from a base station 61a corresponding to the cell 61, to a condition receiving a transmission signal from a base station 62a corresponding to the cell 62, is the diversity hand over.

In this case, since a plurality of antennas receive signals simultaneously, reception state of the device 100 is switched from a receiving condition of the transmission signal of the base station 61a to a receiving condition of the transmission signal of the base station 62a without momentaneous interruption of communication. Here, "cell" is a area where the transmission signal from the base station reaches. By presence of a plurality of cells, mobile communication in wide range can be realized.

Figure 9:
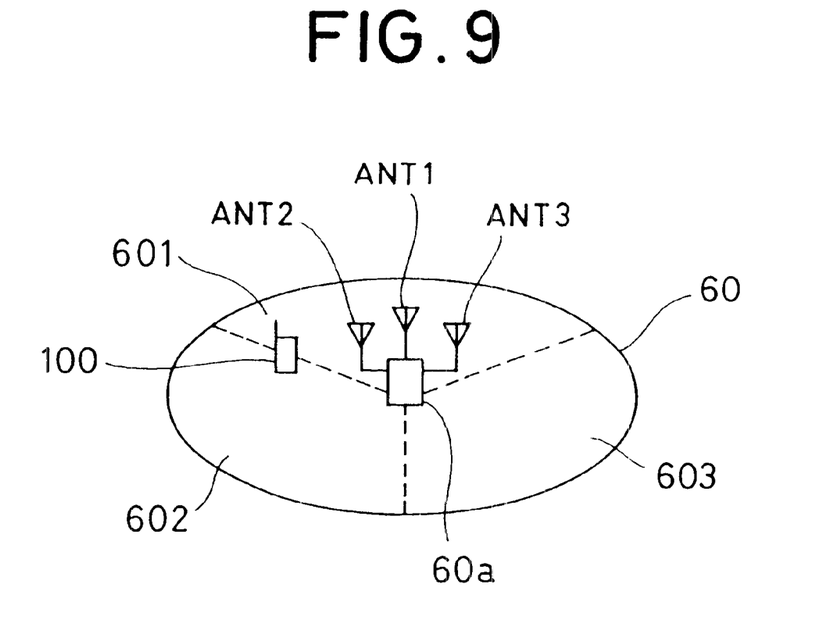
FIG. 9 is an illustration showing a relationship of positions of a mobile station and a base station in the case where a soft hand over is to be performed.

In contrast to this, the soft hand over, in which the sectors are switched, is operation for switching receiving condition when the device 100 as the mobile station is located at a position where a sector 601 and a sector 602 overlap, from a condition receiving a transmission signal of an antenna of lower reception power to a condition receiving a transmission signal of an antenna of higher reception power, as shown in FIG. 9. For example, the operation for switching from the condition receiving the transmission signal from an antenna ANT1 corresponding to the sector 601 to the condition receiving the transmission signal from an antenna ANT2 corresponding to the sector 602.

In this case, since the signals are received from a plurality of antennas simultaneously, communication can be switched from the receiving condition of the transmission signal of the antenna ANT1 to the receiving condition of the transmission signal of the antenna ANT2 without momentaneous interruption. Here, "sector" is a range of reaching the transmission signal from one antenna of the base station 60a. Assuming that three antennas ANT1 to ANT3 are provided for one base station 60a, three sectors 601 to 603 are present within the cell of the base station. In this case, by differentiating directionalities of the three antennas, three sectors are provided within the same cell.

Figure 1:
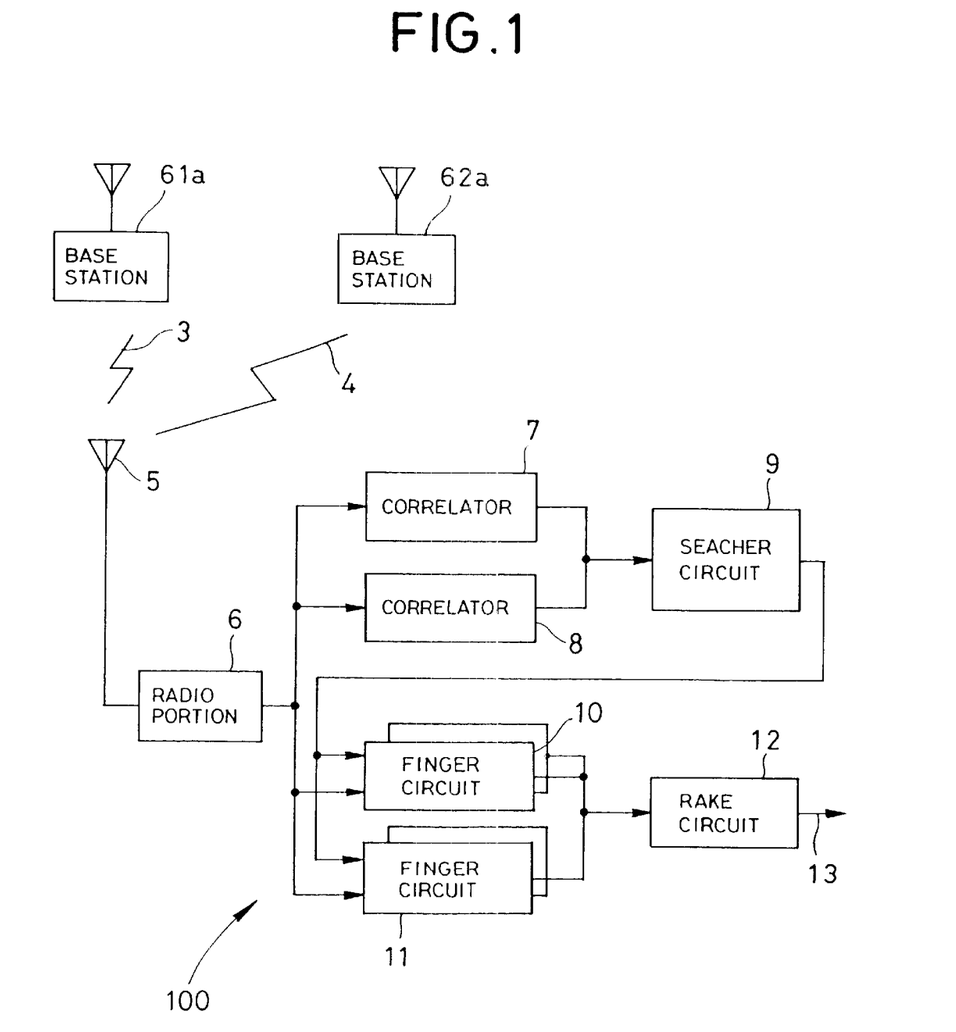
FIG. 1 is a block diagram showing a construction of a CDMA mobile communication system.

Operation of the mobile station upon performing the foregoing diversity hand over and soft hand over (which may be referred to as "hand over" as generally referred to), will be discusses with reference to the drawings. FIG. 1 is a block diagram showing an internal construction of the mobile station. In FIG. 1, there is shown a construction of the major part of the mobile station upon diversity hand over.

The device 100 as the mobile station receives transmission signals 3 and 4 of radio wave from the base stations 61a and 62a by means of an antenna 5. The received signals 3 and 4 are converted into a chip rate by a radio portion 6. The transmission signal of the base station 61a converted into the chip rate is despread by a correlator 7 for the base station 61a and the radio wave of the base station 62a is despread by a correlator 8 for the base station 62a. These correlators 7 and 8 have function for shifting a phase for a signal which is received and demodulated, per a given interval, and establish correlation between the phase shifted signal and a known data (spread code). Then, the correlators 7 and 8 output delay profile data.

For the signals of respective base stations 61a and 62a despread in the correlators 7 and 8, peak detection of a signal level (power) is performed by a searcher circuit 9 for recognizing a plurality of distributed signals.

A plurality of recognized signals are assigned to a finger circuit 10 for the base station 61a and a finger circuit 11 for the base station 62a. Then data after dispreading by respective finger circuits 10 and 11 are combined by a Rake circuit 12 for outputting a decoded data 13.

Figure 10:
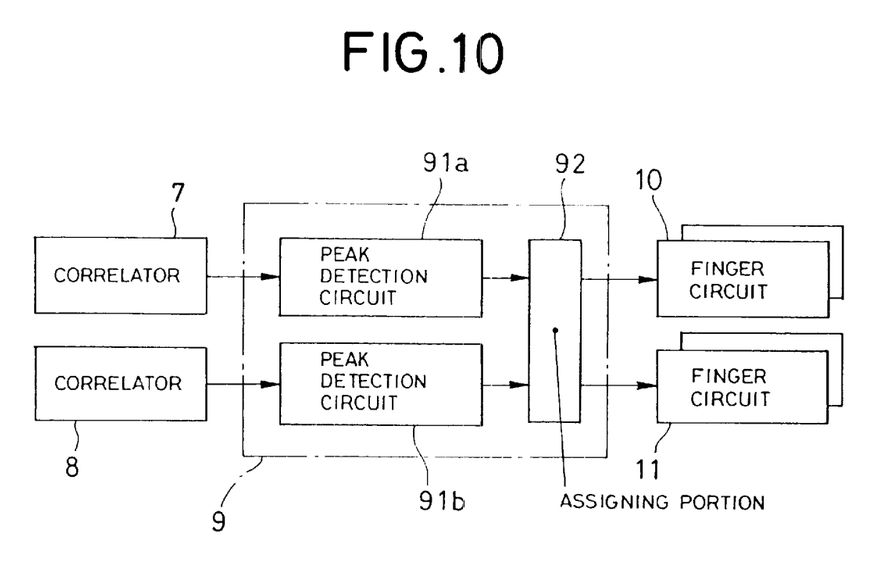
FIG. 10 is a block diagram showing the internal construction of a typical searcher circuit.

Here, an internal construction of the typical searcher circuit 9 is shown in FIG. 10. Referring to FIG. 10, the searcher circuit 9 is constructed with a peak detection circuit 91a for detecting a peak value with respect to the delay profile data provided corresponding to the correlator 7, a peak detection circuit 91b for detecting a peak value with respect to the delay profile data provided corresponding to the correlator 8, and assigning portion 92 for assigning the peak values detected by the peak detections circuits 91a and 91b to the finger circuits 10 and 11. With such construction, the peak values of the delay profile data for the reception signal is assigned to the finger circuit.

Here, if a plurality of radio waves separately arriving should have the same interference if transmitted from the same radio wave transmission source. However, when radio waves transmitted from different radio wave transmission sources are to be combined as in the hand over, magnitudes of interference should be different at different radio wave transmission source. For example, magnitudes of interference are differentiated in such a manner that the radio wave transmitted from one transmission source is as illustrated in FIG. 11A and the radio wave transmitted from the other transmission source is as illustrated in FIG. 11B.

Figure 11A:
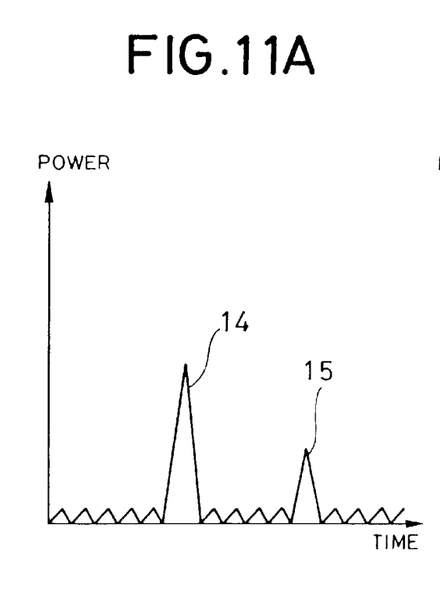
FIGS. 11A and 11B show delay profile data output from correlators for respective base stations.
Figure 11B:
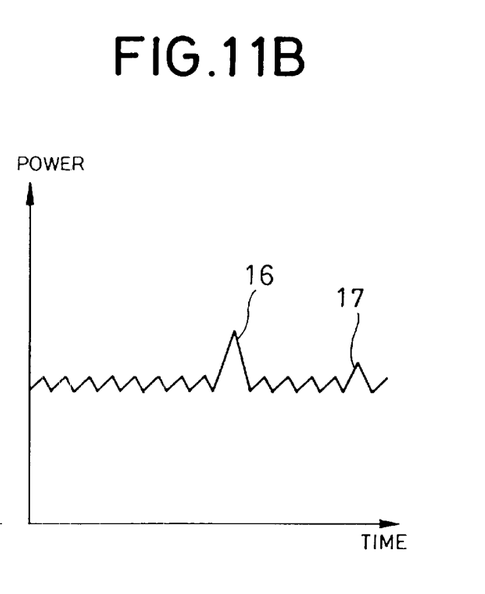
Figure 12:
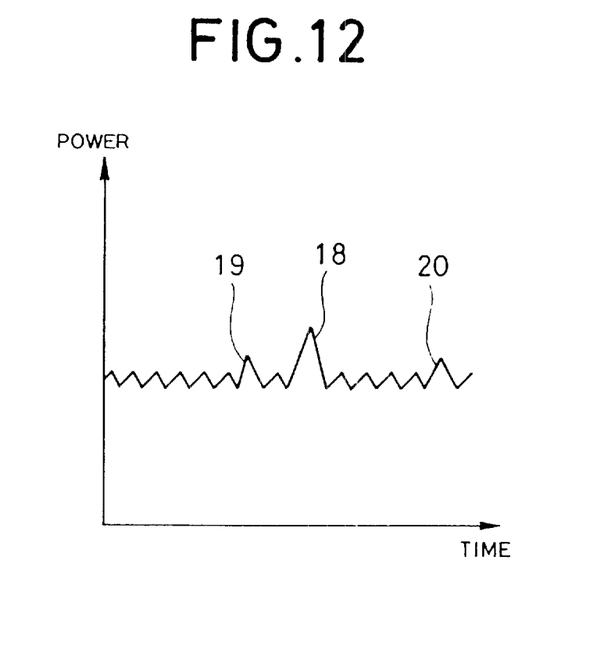
FIG. 12 is a waveform chart showing a result of simple combination of an output waveform of the delay profile data of FIG. 11A and an output waveform of the delay profile data of FIG. 11B.

Consideration is given for the case where the reception signals shown in FIGS. 11A and 11B are combined in the Rake circuit 12. In this case, if the reception signals are combined by simple addition and if the arriving signal levels are different, the signal of lower reception power may be extinguished by the signal of higher reception power. Namely, since the peak value 15 of the base station 61a is lower than or equal to a noise level of the base station 62a, the signal from the base station 61a is extinguished as shown in FIG. 12. Then, the finger circuit, output of which is not used, can be present to waste the power consumed by such finger circuit.

On the other hand, since the base station spreads the transmission signal with a unique spread code, if the output data of the correlators of the base stations 61a and 62a are combined, it becomes impossible to identify the base station corresponding to the peal value as shown in FIG. 12. This make the searcher circuit 9 impossible to identify the base station to be assigned for the finger circuit.

Figure 13:
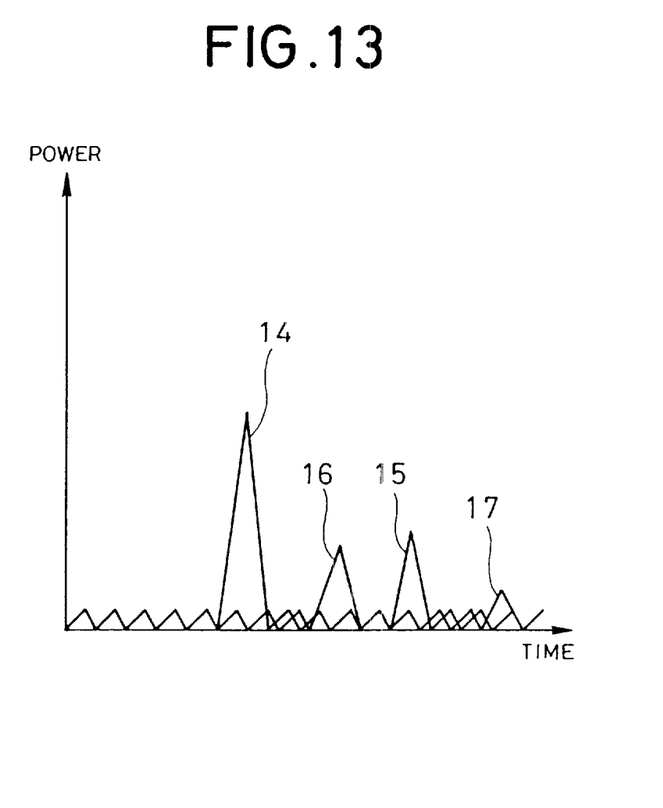
FIG. 13 is a waveform chart showing a result of combination of the delay profile data at equal noise level at respective base stations.

In order to solve this problem, it can be considered to perform Rake maximum ratio combination for combining the output data of the correlators at equal noise levels from respective transmission source in the Rake circuit. By such Rake maximum ratio combination, each peak values will never be extinguishede as shown in FIG. 13. Thus, outputs of all of the finger circuits can be combined without wasting.

However, in order to perform Rake maximum ratio combination, it becomes necessary to derive a noise level per the base station and to perform conversion of the signal level for achieving the equal noise level. Then, process becomes complicate and circuit scale is increased, and power consumption is also increased.

SUMMARY OF THE INVENTION

The present invention has been worked out in view of the problems set forth above. It is therefore an object of the present invention to provide a CDMA mobile communication system and a CDMA mobile communication method which can reduce power consumption.

According to the first aspect of the present invention, a CDMA mobile communication device for realizing a CDMA communication by combining outputs of finger circuits performing despreading for reception signals, comprises:

subtracting means for performing subtraction between delay profile data respectively output from at least two correlators respectively corresponding to reception signals transmitted from mutually different antennas; and assigning means for assigning the finger circuits for despreading reception signals to result of subtraction having signal level higher than and lower than a reference level so that outputs of the assigned finger circuits are combined.

Assigning means suppress assignment of the finger circuit for the peak value when noise levels of the delay profile data output from said at least two correlators are mutually different and when the peak value of one delay profile data is lower than a noise level of the other delay profile data. The mutually different antennas are provided in the same base station or the different base station respectivery.

According to the second aspect of the present invention, a CDMA mobile communication device for realizing a CDMA communication by combining outputs of finger circuits performing despreading for reception signals, comprises:

subtracting means for performing subtraction between delay profile data respectively output from at least two correlators respectively corresponding to reception signals transmitted from mutually different antennas;

peak value detecting means for detecting peak values of the result of subtraction; and assigning means for assigning the finger circuits for despreading reception signals to the peak values of result of subtraction having signal level higher than and lower than a reference level so that outputs of the assigned finger circuits are combined.

Assigning means suppress assignment of the finger circuit for the peak value when noise levels of the delay profile data output from said at least two correlators are mutually different and when the peak value of one delay profile data is lower than a noise level of the other delay profile data.

The subtracting means, the peak value detecting means and the assigning means are integrated into a single chip. The mutually different antennas are provided in the same base station or the different base station respectivery.

According to the third aspect of the present invention, a searcher circuit for a CDMA mobile communication device for realizing a CDMA communication by combining outputs of finger circuits performing despreading for reception signals, comprises:

subtracting means for performing subtraction between delay profile data respectively output from at least two correlators respectively corresponding to reception signals transmitted from mutually different antennas;

peak value detecting means for detecting peak values of the result of subtraction; and assigning means for assigning the finger circuits for despreading reception signals to the peak values of result of subtraction having signal level higher than and lower than a reference level so that outputs of the assigned finger circuits are combined.

According to the fourth aspect of the present invention, a CDMA mobile communication method for realizing a CDMA communication by combining outputs of finger circuits performing despreading for reception signals, comprises:

subtracting step of performing subtraction between delay profile data respectively output from at least two correlators respectively corresponding to reception signals transmitted from mutually different antennas;

peak value detecting step of detecting peak values of the result of subtraction; and assigning step of assigning the finger circuits for despreading reception signals to the peak values of result of subtraction having signal level higher than and lower than a reference level so that outputs of the assigned finger circuits are combined.

In short, the present invention can avoid wasteful assignment of the finger circuit and whereby can restrict power consumption without causing increasing complexity of the process or the size of the circuit, by assigning the finger circuits for the peak values of the result of subtraction of the delay profile data, only when it is higher than or lower than a reference level.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention. Also, in the following disclosure, like elements will be identified by like reference numerals throughout the disclosure and drawings.

FIG. 1 is a block diagram showing one embodiment of a CDMA mobile communication system according to the present invention. In FIG. 1, a communication device 100 serves as a mobile station in the mobile communication system. Therefore, the device 100 is constructed with an antenna 5 for transmitting and receiving a radio wave with base stations, a radio portion 6 converting a received radio wave into a chip rate, correlators 7 and 8 performing dispreading for the chip rate after conversion, a searcher circuit 9 detecting peaks of signals after dispreading, finger circuits 10 and 11 to be assigned a plurality of recognized ratio waves, and a Rake circuit 12 combining data after dispreading. It should be noted that FIG. 1 shows a condition where hand over from a base station 61a to a base station 62a is taken place.

With such construction, the communication device 100 as the mobile station receives transmission signals 3 and 4 from the base stations 61a and 62a through the antenna 5. The received signals are converted into the chip rate by the radio portion 6. The transmission signal of the base station 61a converted into the chip rate is despread by the correlator 7 transmission signal of the base station 62a converted into the chip rate by the radio portion 6 is despread by the correlator 8 corresponding to the base station 62a. For the despread signals of the base stations 61a and 62a, peak detection of the reception powers is performed by the searcher circuit 9. By the detected peak values, a plurality of distributed signals are recognized.

Next, a plurality of recognized signals are assigned to the finger circuit 10 for the base station 61a and the finger circuit 11 for the base station 62a. Also, data after dispreading are combined by the Rake circuit 12 for outputting a decoded data 13.

Figure 2:
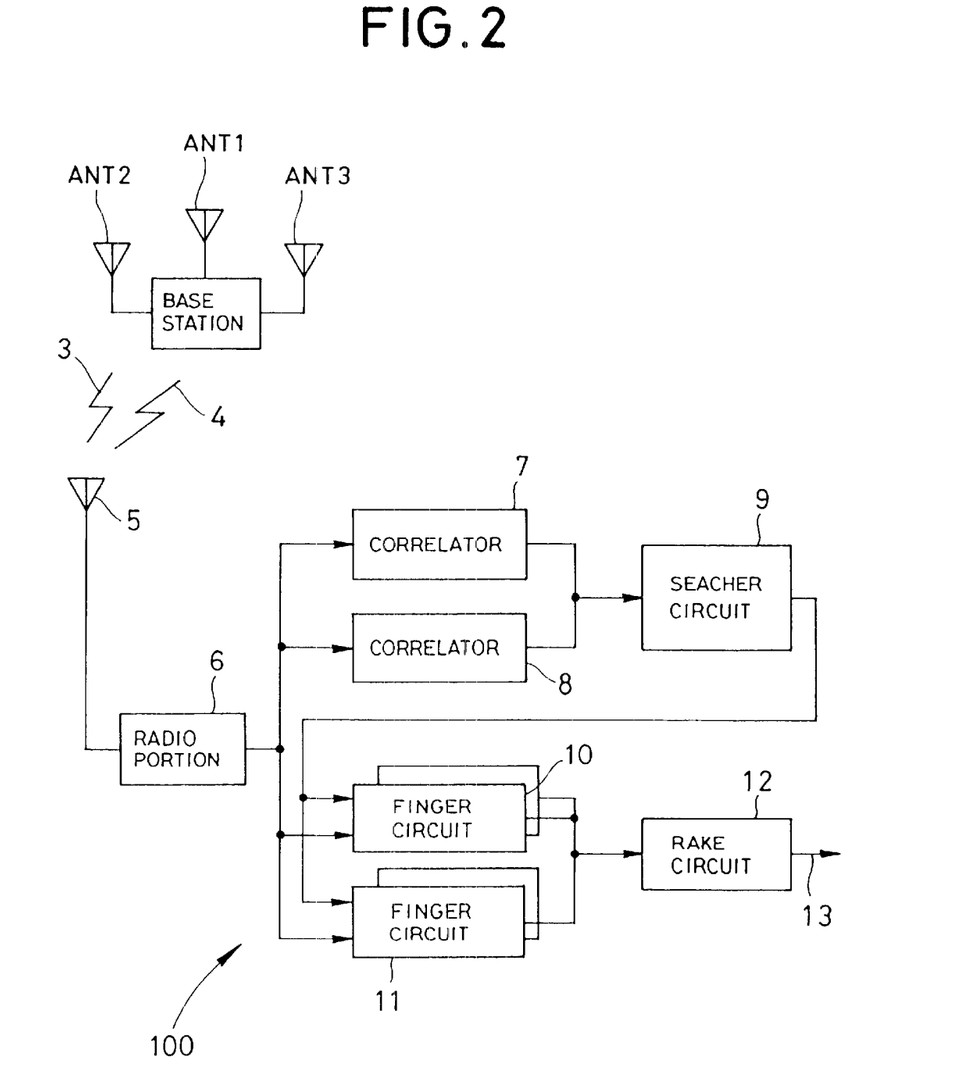
FIG. 2 is a block diagram showing a construction of the CDMA mobile communication system, illustrating a hand over from one antenna to the other antenna of the same base station.

As set forth above, the condition shown in FIG. 1 is at the occurrence of hand over (diversity hand over) from the base station 61a to the base station 62a. It should be noted that the present invention is applicable not only for the condition where the diversity hand over is taken place, but also for a condition at the occurrence of hand over (soft hand over) from one antenna to another antenna of the same base station. This condition is illustrated in FIG. 2. Namely, in the condition shown in FIG. 2, the antenna is switched from one antenna ANT1 of the base station 60a to another antenna ANT2 of the same base station for sift hand over.

Figure 3:
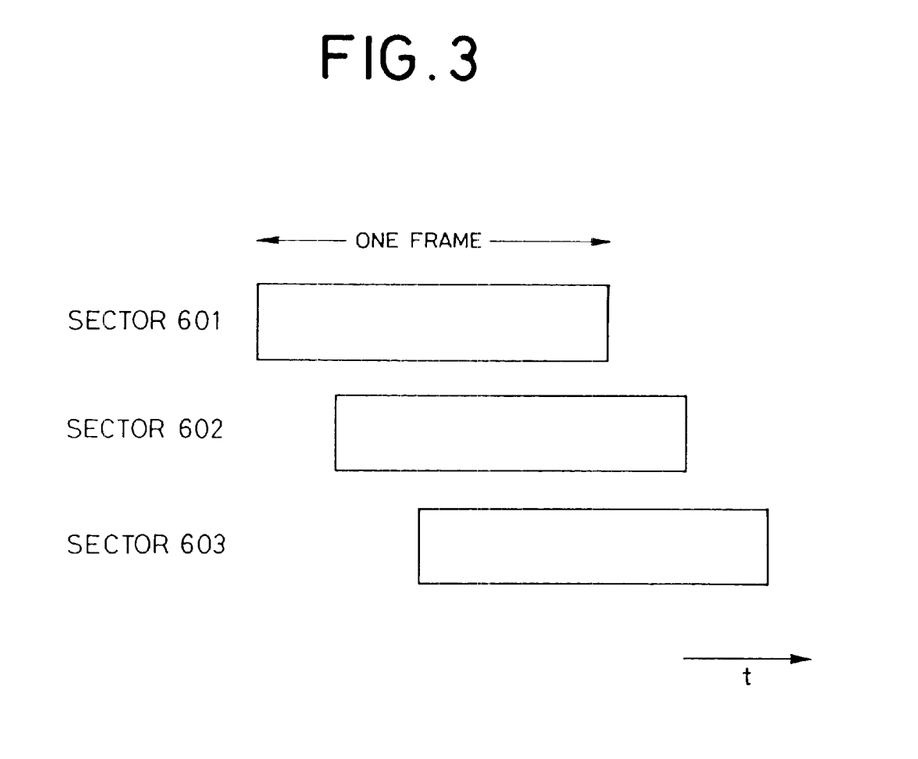
FIG. 3 is an explanatory illustration of transmission signals from respective antennas in the same base station.

From respective antennas ANT1 to ANT3 of the base station 60a, signals with shifting phases for sectors 601 to 603 are transmitted as set forth above. Namely, as shown in FIG. 3, observing one frame of the transmission signal, the signal transmitted at the sector 601, the signal transmitted at the sector 602 and the signal transmitted at the selector 603 are differentiated the phased with each other.

Returning to FIG. 2, the internal construction per se of the communication device 100 as the mobile station is the same as that of FIG. 1. Namely, the present invention is characterized by that peak detection is performed after subtraction of the other delay profile data from one delay profile data, output from respective correlators corresponding to the reception signals from different antennas. The different antennas may be provided in the same base station or in mutually different base stations. Accordingly, in the construction shown in FIG. 2, the following operation is performed.

Here, it is assumed that the output waveforms of the correlators 7 and 8 corresponding to the base stations 61a and 62a of FIG. 1 are as illustrated in FIGS. 11A and 11B. Namely, the internal construction of the correlators 7 and 8 are the same as those in the prior art.

Referring to FIG. 11A, the delay profile data of the base station 61a has two peak values of the reception power. Namely, a first peak value 14 and a second peak value 15 are the peak values of the base station 61a.

Referring to FIG. 11B, the delay profile data of the base station 62a has two peak values of the reception power. Namely, a first peak value 16 and a second peak value 17 are the peak values of the base station 62a.

Figure 4:
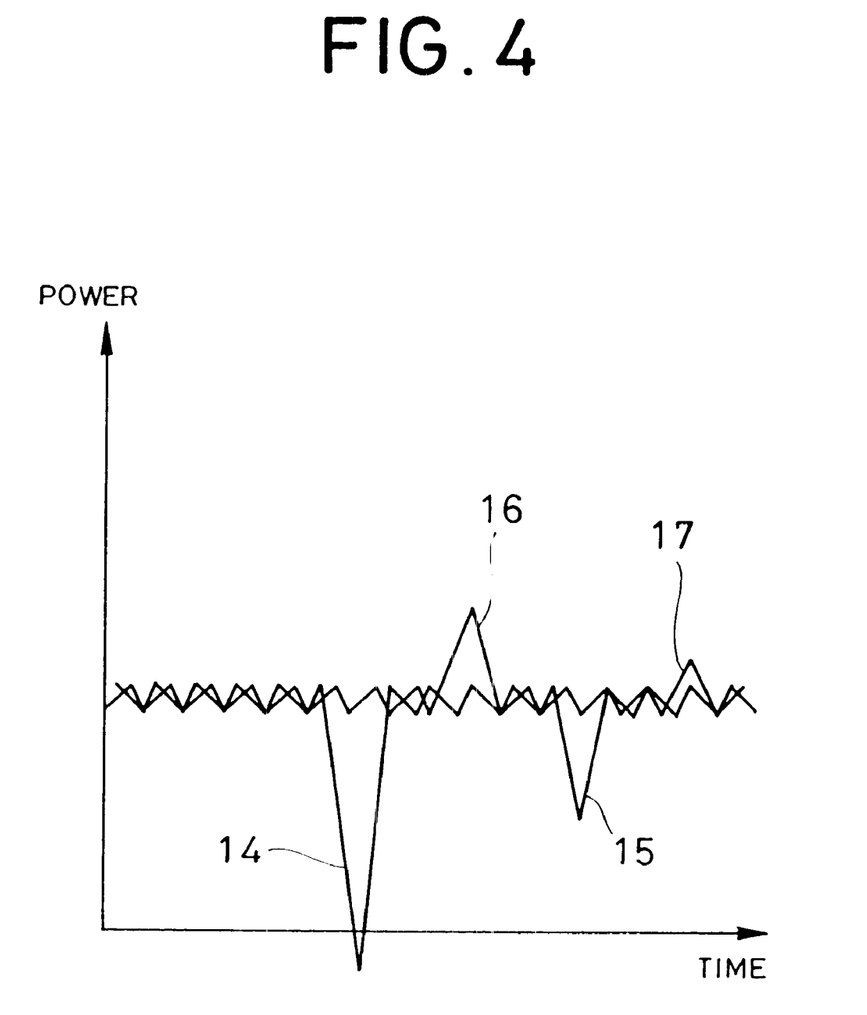
FIG. 4 is an illustration showing a data after subtraction of delay profile data by a subtracting circuit.

As can be appreciated from FIGS. 11A and 11B, the delay profile data of the base stations 61a and 62a are different in reception levels. Namely, noise levels are different in the base stations 61a and 62a. Then, according to the present invention, a difference of the delay profile data of the base stations 61a and 62a is calculated. In the particular example illustrated in FIGS. 11A and 11B, the delay profile data of the base station 61a is subtracted from the delay profile data of the base station 62a. A resultant subtracted data is shown in FIG. 4.

In the searcher circuit 9, the subtracted data resulting from subtraction of the delay profile data of the base station 61a from the delay profile data of the base station 62a is assigned to the finger circuits. In this case, the peak values above the noise level are assigned to the finger circuit 11 for the base station 62a and the peak values below the noise level are assigned to the finger circuit 10 for the base station 61a.

Figure 5:
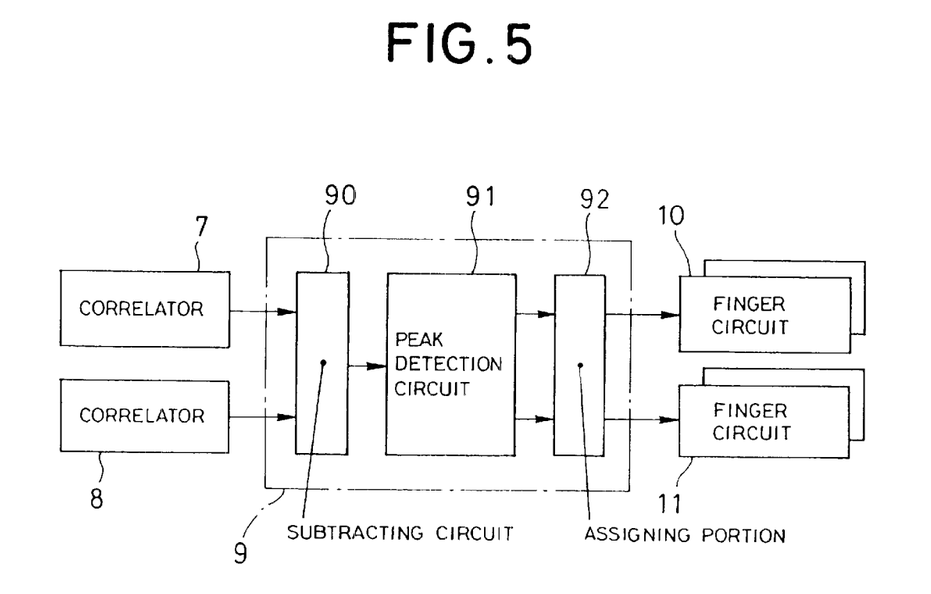
FIG. 5 is a block diagram showing an example of an internal construction of a searcher circuit.

The internal construction of the searcher circuit 9 in the shown embodiment of the mobile station according to the present invention is illustrated in FIG. 5. Referring to FIG. 5, the searcher circuit 9 is constructed with a subtracting circuit 90 performing subtraction of the delay profile data output from the correlators 7 and 8, a peak detection circuit 91 detecting peak values above and below the noise level in the result of subtraction, and assigning portion 92 for assigning peak values detected by the peak detection circuit 91 to the finger circuits 10 and 11.

With the construction set forth above, the peak values of the resultant data of subtraction of the delay profile data in connection with the reception signals are assigned to the finger circuits. In this case, the peak values above the noise level is assigned to the finger circuit 10 and the peak values below the noise level is assigned to the finger circuit 11. In FIG. 5, the subtracting circuit 90, the peak detection circuit 91 and the assigning portion 92 in the searcher circuit 9 may be integrated on a single chip of LSI (Large Scale Integrated Circuit), such as for realizing with a DSP (Digital Signal Processor). Integrating in the LSI is advantageous in downsizing of the communication device 100.

In the meanwhile, in order to obtain data shown in FIG. 4, it becomes necessary to subtract data having lower noise level from data having higher noise level. For realizing this, it becomes necessary to provide a switch 90a at preceding stage of the subtracter 90b in the subtracting circuit 90 for switching between subtracting side and subtracted side. In this case, output levels of the correlators 7 and 8 are compared by a control portion 200 for controlling switching by the switch 90a on the basis of the result of comparison. In the shown example, the switch 90a may be switched so that the signal of FIG. 11B is input on subtracted side and the signal of FIG. 11A is input on subtracting side.

Figure 6:
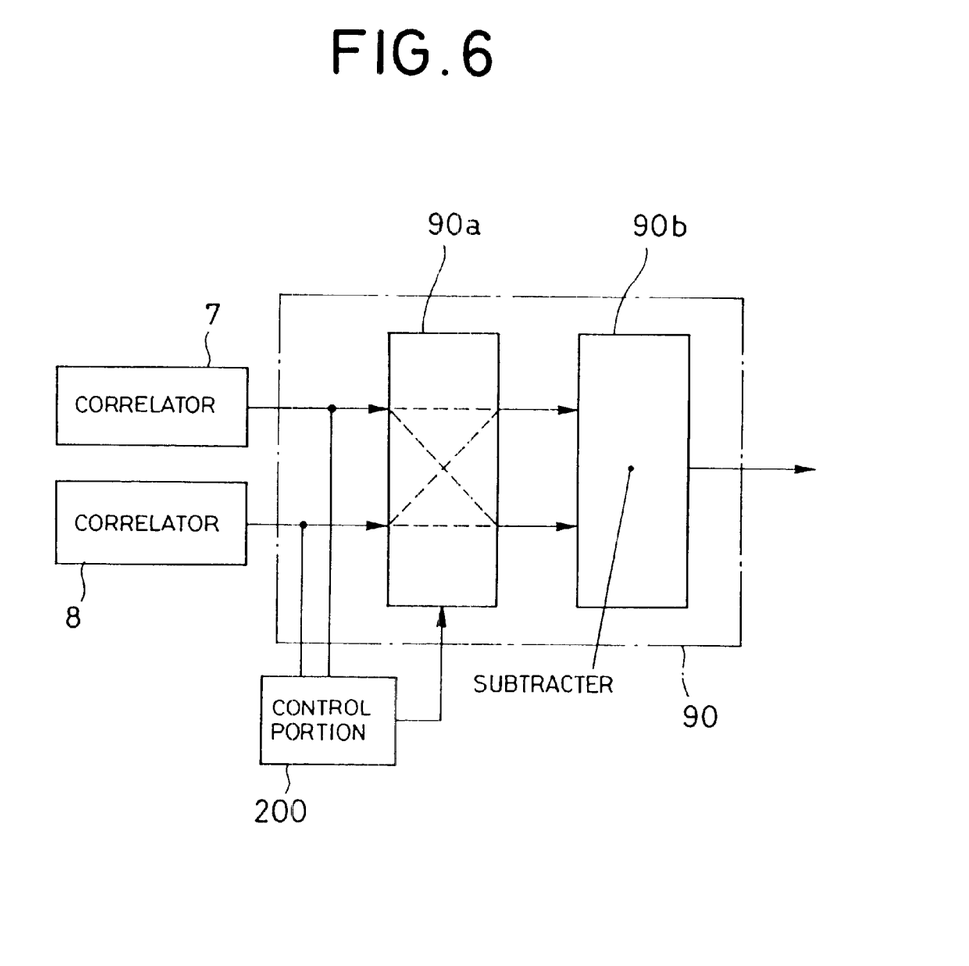
FIG. 6 is a block diagram showing an example of a construction of the subtracting circuit in the searcher circuit of FIG. 5.

It should be appreciated that when transmission signals are received from three antennas, output levels of the delay profile data from three correlators are compared for switching the switch for subtracting the second higher delay profile data from the highest delay profile data. In this case, the switch of three inputs has to be employed.

In the shown example as set forth above, the first peak value 16 and the second peak value 17 of the base station 62a is assigned to the finger circuit 11 for the base station 62a. Then, the first peak value 14 of the base station 61a is assigned to the finger circuit 10 for the base station 61a.

At this time, since the peak value 15 is not present below the zero level of reception power, it is not assigned to the finger circuit. As set forth above, the searcher circuit 9 does not assign the second peak value 15 of the base station 61a to the finger circuit. Namely, the peak value of the delay profile data is not assigned to the finger circuit which output data not be used upon combining in the Rake circuit 12. Namely, upon assigning the finger circuit, if the noise levels of the delay profile data respectively output from two correlators are different from each other, assignment of the finger circuit for the peak value is suppressed when the peak value of one delay profile data is lower than the noise level of the other delay profile data. Accordingly, the finger circuit may not be operated wastefully to reduce power consumption.

Thus, without performing maximum ratio combination in Rake combination, effective finger circuit can be selected to simplify the process, to reduce the scale of the circuit and thus to reduce power consumption.

Here, in the CDMA mobile communication system according to the present invention, the following CDMA mobile communication method is realized. Namely, the shown method is for CDMA mobile communication method for realizing CDMA communication by combining outputs of the finger circuits which perform dispreading for the reception signals, in which the other delay profile data among those output from at least two correlators corresponding to the reception signals from mutually different antennas, is subtracted from one delay profile data for detecting the peak values with respect to the result of subtraction so that the finger circuits for despreading the reception signals are assigned to the peak value above the noise level and to the peak value below the noise level. Then, the outputs of the assigned finger circuits are combined.

Figure 7:
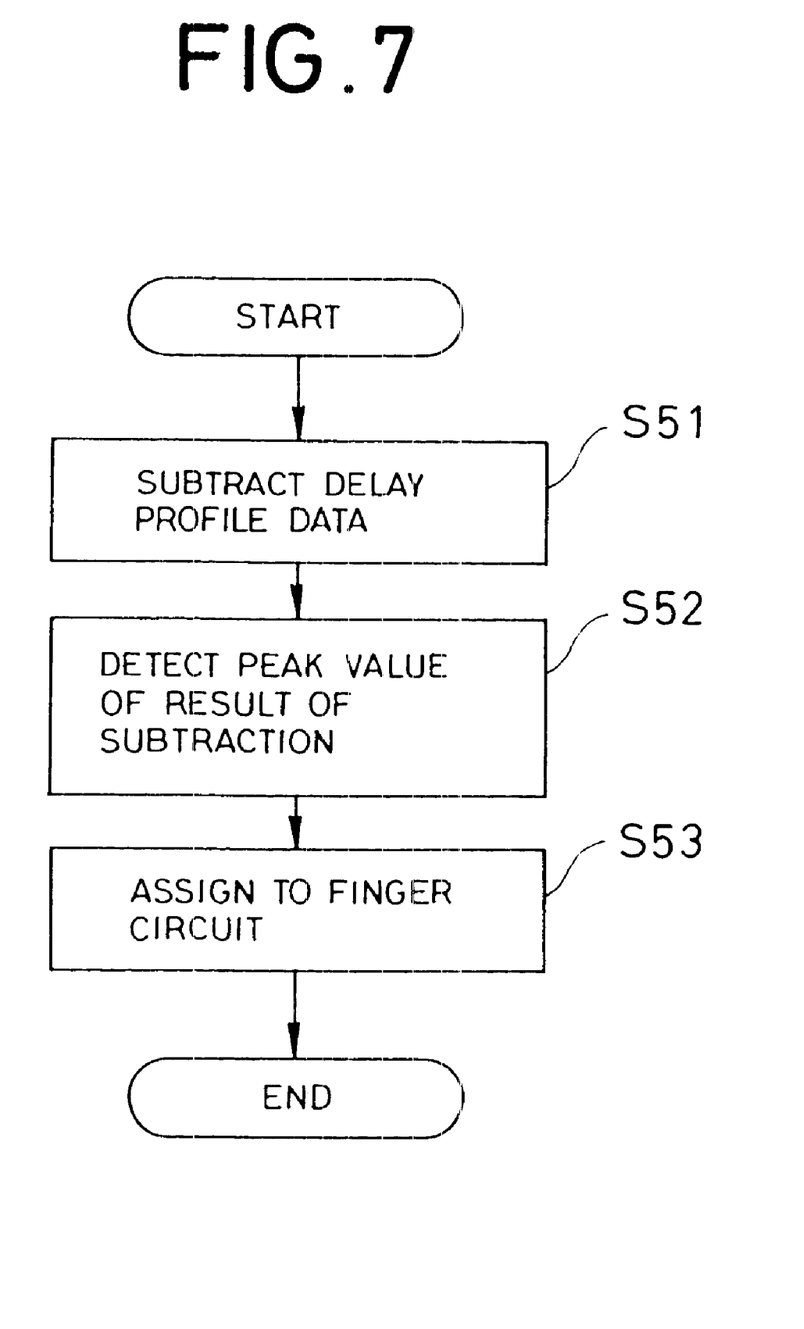
FIG. 7 is a flowchart showing a communication method in the CDMA mobile communication system according to the present invention.

The communication method will be discussed with reference to the flowchart of FIG. 7. In FIG. 7, at first, among the delay profile data respectively output from at least two correlators corresponding to the reception signals from mutually different antennas, the other data is subtracted from one data (step 51). Then, the peak values are detected with respect to the result of subtraction (step 52). Then, the finger circuits for despreading of the reception signals are assigned to the peak values above the noise level and to the peak values below the noise level, respectively (step 53). The outputs of the assigned finger circuits are combined.

With the communication method set forth above as shown in FIG. 4, the first peak value 16 and the second peak value 17 of the base station 62a are assigned to the finger circuit 11. Then, the peak value 14 is assigned to the finger circuit 10 for the base station 61a.

At this time, since the peak value 15 is not present below the zero level of reception power, it is not assigned to the finger circuit. Namely, upon assigning the finger circuit, if the noise levels of the delay profile data respectively output from two correlators are different from each other, assignment of the finger circuit for the peak value is suppressed when the peak value of one delay profile data is lower than the noise level of the other delay profile data.

Thus, the searcher circuit 9 may not assign the path lower than the noise level of the other base station to the finger circuit. Therefore, without performing maximum ratio combination in Rake combination, effective finger circuit can be assigned.

As set forth above, since the searcher circuit 9 does not assign the peak value of the delay profile data to the finger circuit outputting data which will not be used upon combination in the Rake circuit 12, the finger circuit will never operated wastefully. The power consumption can be reduced.

As set forth above, the present invention avoid wasteful assignment of the finger circuit and whereby can restrict power consumption, by assigning the finger circuits for the peak values of the result of subtraction of the delay profile data, only when it is higher than or lower than a reference level.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A CDMA mobile communication device for realizing a CDMA communication by combining outputs of finger circuits performing despreading for reception signals, comprising:

subtracting means for performing subtraction between delay profile data respectively output from at least two correlators respectively corresponding to reception signals transmitted from mutually different antennas; and assigning means for assigning said finger circuits for despreading reception signals to result of subtraction having signal level higher than and lower than a reference level so that outputs of the assigned finger circuits are combined.

2. A CDMA mobile communication device for realizing a CDMA communication by combining outputs of finger circuits performing despreading for reception signals, comprising:

subtracting means for performing subtraction between delay profile data respectively output from at least two correlators respectively corresponding to reception signals transmitted from mutually different antennas;

peak value detecting means for detecting peak values of the result of subtraction; and assigning means for assigning said finger circuits for despreading reception signals to said peak values of result of subtraction having signal level higher than and lower than a reference level so that outputs of the assigned finger circuits are combined.

3. A CDMA mobile communication system as set forth in claim 1, wherein said assigning means suppress assignment of said finger circuit for the peak value when noise levels of said delay profile data output from said at least two correlators are mutually different and when the peak value of one delay profile data is lower than a noise level of the other delay profile data.

4. A CDMA mobile communication system as set forth in claim 2, wherein said subtracting means, said peak value detecting means and said assigning means are integrated into a single chip.

5. A CDMA mobile communication system as set forth in claim 1, wherein said mutually different antennas are provided in the same base station.

6. A CDMA mobile communication system as set forth in claim 1, wherein said mutually different antennas are provided in the different base stations respectively.

7. A searcher circuit for a CDMA mobile communication device for realizing a CDMA communication by combining outputs of finger circuits performing despreading for reception signals, comprising:

subtracting means for performing subtraction between delay profile data respectively output from at least two correlators respectively corresponding to reception signals transmitted from mutually different antennas;

peak value detecting means for detecting peak values of the result of subtraction; and assigning means for assigning said finger circuits for despreading reception signals to said peak values of result of subtraction having signal level higher than and lower than a reference level so that outputs of the assigned finger circuits are combined.

8. A searcher circuit as set forth in claim 7, wherein said assigning means suppress assignment of said finger circuit for the peak value when noise levels of said delay profile data output from said at least two correlators are mutually different and when the peak value of one delay profile data is lower than a noise level of the other delay profile data.

9. A searcher circuit as set forth in claim 7, wherein said subtracting means, said peak value detecting means and said assigning means are integrated into a single chip.

10. A searcher circuit as set forth in claim 7, wherein said mutually different antennas are provided in the same base station.

11. A searcher circuit as set forth in claim 7, wherein said mutually different antennas are provided in the different base stations respectively.

12. A CDMA mobile communication method for realizing a CDMA communication by combining outputs of finger circuits performing despreading for reception signals, comprising:

subtracting step of performing subtraction between delay profile data respectively output from at least two correlators respectively corresponding to reception signals transmitted from mutually different antennas;

peak value detecting step of detecting peak values of the result of subtraction; and assigning step of assigning said finger circuits for despreading reception signals to said peak values of result of subtraction having signal level higher than and lower than a reference level so that outputs of the assigned finger circuits are combined.

13. A CDMA mobile communication method as set forth in claim 12, wherein in said assigning step, assignment of said finger circuit for the peak value is suppressed when noise levels of said delay profile data output from said at least two correlators are mutually different and when the peak value of one delay profile data is lower than a noise level of the other delay profile data.

14. A CDMA mobile communication method as set forth in claim 12, wherein said mutually different antennas are provided in the same base station.

15. A CDMA mobile communication method as set forth in claim 12, wherein said mutually different antennas are provided in the different base stations respectively.

* * * * *